(12) United States Patent
Hirade et al.

(10) Patent No.: US 10,837,486 B2
(45) Date of Patent: Nov. 17, 2020

(54) SHAFT MEMBER FOR FLUID BEARING DEVICE, MANUFACTURING METHOD THEREFOR, AND FLUID BEARING DEVICE

(71) Applicant: NTN CORPORATION, Osaka (JP)

(72) Inventors: Jun Hirade, Mie (JP); Masashi Yamagou, Mie (JP); Mikihisa Fujiwara, Mie (JP); Tetsuya Kurimura, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/335,283

(22) PCT Filed: Aug. 31, 2017

(86) PCT No.: PCT/JP2017/031481
§ 371 (c)(1),
(2) Date: Mar. 21, 2019

(87) PCT Pub. No.: WO2018/061606
PCT Pub. Date: Apr. 5, 2018

(65) Prior Publication Data
US 2020/0016650 A1    Jan. 16, 2020

(30) Foreign Application Priority Data

Sep. 27, 2016    (JP) ................................ 2016-187983

(51) Int. Cl.
*F16C 17/26* (2006.01)
*F16C 3/02* (2006.01)
(Continued)

(52) U.S. Cl.
CPC ................ *F16C 17/26* (2013.01); *F16C 3/02* (2013.01); *F16C 33/14* (2013.01); *B23B 1/00* (2013.01);
(Continued)

(58) Field of Classification Search
CPC ........ F16C 17/02; F16C 17/026; F16C 17/10; F16C 17/102; F16C 17/107; F16C 33/10;
(Continued)

(56) References Cited

U.S. PATENT DOCUMENTS 5,533,811 A * 7/1996 Polch .................. F16C 33/1085
384/107
6,554,474 B2 * 4/2003 Saito ..................... F16C 17/026
384/107
(Continued)

FOREIGN PATENT DOCUMENTS

JP        4504391        7/2010

OTHER PUBLICATIONS

International Search Report dated Oct. 24, 2017 in International (PCT) Application No. PCT/JP2017/031481.
(Continued)

*Primary Examiner* — James Pilkington
(74) *Attorney, Agent, or Firm* — Wenderoth, Lind & Ponack, L.L.P.

(57) ABSTRACT

A shaft member for a fluid bearing device includes, on an outer peripheral surface thereof, two bearing surfaces (31 and 32) separated from each other in an axial direction, and a middle relief portion (33) formed between the bearing surfaces (31 and 32) and having a diameter smaller than a diameter of the bearing surfaces. The middle relief portion (33) includes a cylindrical surface portion (331) having a ground surface, and stepped portions (332) arranged on both axial sides of the cylindrical surface portion and having a diameter difference from the cylindrical surface portion.

19 Claims, 7 Drawing Sheets

(51) Int. Cl.
*B23B 1/00* (2006.01)
*F16C 33/14* (2006.01)
*F16C 33/10* (2006.01)

(52) U.S. Cl.
CPC .......... *F16C 33/10* (2013.01); *F16C 2220/62* (2013.01); *F16C 2220/70* (2013.01); *F16C 2370/12* (2013.01)

(58) Field of Classification Search
CPC .. F16C 33/14; F16C 2220/70; F16C 2370/12; F16C 17/26; F16C 2220/62
See application file for complete search history.

(56) References Cited

U.S. PATENT DOCUMENTS

| | | | | |
|---|---|---|---|---|
| 6,749,339 | B1* | 6/2004 | Murabe | F16C 17/02 384/100 |
| 8,148,862 | B2* | 4/2012 | Shirai | F16C 17/02 310/67 R |
| 9,003,664 | B2* | 4/2015 | Yamashita | F16C 33/14 29/895.3 |
| 2003/0213128 | A1* | 11/2003 | Kaimi | B24B 5/04 29/898.02 |
| 2013/0147308 | A1* | 6/2013 | Yu | F16C 17/107 310/216.001 |

OTHER PUBLICATIONS

International Preliminary Report on Patentability and Written Opinion of the International Searching Authority dated Apr. 2, 2019 in International (PCT) Application No. PCT/JP2017/031481.

* cited by examiner

SHAFT MEMBER FOR FLUID BEARING DEVICE, MANUFACTURING METHOD THEREFOR, AND FLUID BEARING DEVICE

TECHNICAL FIELD

The present invention relates to a shaft member for a fluid bearing device, a manufacturing method therefor, and a fluid bearing device.

BACKGROUND ART

As a bearing device for supporting a shaft of a small-sized motor or the like, there has hitherto been widely known a fluid bearing device for supporting a shaft member so as to be rotatable with a lubricating fluid film formed between the shaft member and a bearing member. Among fluid bearing devices, a fluid dynamic bearing device for generating fluid dynamic pressure in a bearing gap due to dynamic pressure generating grooves formed in an outer peripheral surface of the shaft member or an inner peripheral surface of the bearing member has been widely used in applications that require high speed rotation or high rotational accuracy, specifically, used as a bearing device in, for example, a polygon scanner motor for a laser beam printer, a small-sized cooling fan motor, or a hard disk drive motor.

An example of the fluid dynamic bearing device is disclosed in, for example, JP 4504391 B2 (Patent Literature 1). A shaft member used in the fluid dynamic bearing device of this type generally has radial bearing surfaces at two positions separated from each other in an axial direction so as to suppress run-out of the shaft member. A middle relief portion having an outer-diameter dimension smaller than that of the radial bearing surfaces is formed between the two radial bearing surfaces so as to reduce torque of the shaft member.

Figure 8:
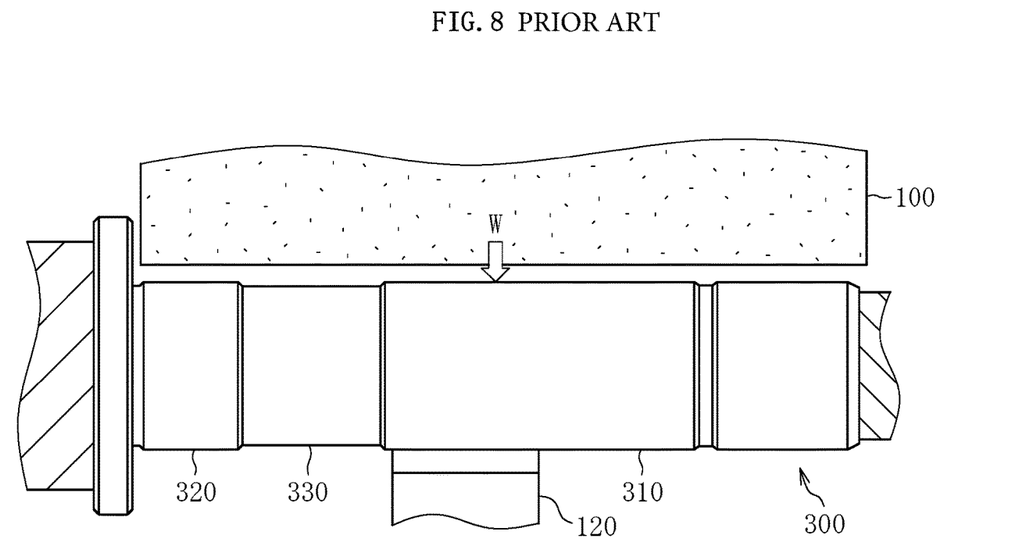
FIG. 8 is a sectional view for illustrating a grinding step of a shaft member in a conventional example.

The shaft member having the above-mentioned configuration is manufactured as follows. Specifically, for example, a metal material is turned to form a shaft material having radial bearing surfaces and a middle relief portion on an outer peripheral surface thereof. After that, as illustrated in FIG. 8, cylindrical grinding is performed by pressing a grinding wheel 100 against radial bearing surfaces 310 and 320 of a shaft material 300. In a state in which the shaft member is incorporated into the fluid dynamic bearing device, a middle relief portion 330 is immersed in lubricant oil, and accuracy of the middle relief portion 330 is not particularly required to be higher. Therefore, grinding on the middle relief portion 330 is omitted in many cases.

When the shaft material 300 is ground, it is required that the vicinity of an axially intermediate portion of the shaft material being rotated is supported by a shoe 120 as a support member so as to support a grinding load from the grinding wheel 100. In this case, support accuracy of the shaft material 300 by the shoe 120 is greatly influenced by surface accuracy after grinding. Thus, it is preferred that support of the shaft material 300 by the shoe 120 be carried out not at the middle relief portion 330 having a turned surface but at the radial bearing surface 310 having a ground surface (see FIG. 1 in Patent Literature 1).

CITATIONS LIST

Patent Literature

Patent Literature 1: JP 4504391 B2

SUMMARY OF INVENTION

Technical Problems

Conventionally, the bearing surface 310 on the counter-flange-side of the shaft material is located in the vicinity of the axially intermediate of the shaft material. Thus, for cylindrical grinding, the shoe 120 can be arranged in the vicinity of an action line of the grinding load W (grinding-load center line). Therefore, it is conceivable that an orientation of the shaft material during the grinding is in a stabilized state.

Meanwhile, in recent years, a higher capacity of a hard disk drive (HDD) has been demanded in order that the HDD becomes suitable for use in a server or the like. In such HDD of high capacity type, the number of the disks is increased, so that the shaft is liable to cause run-out. In order to suppress this, it is required to further enhance bearing rigidity of the fluid dynamic bearing device. Meanwhile, reduction in power consumption has also been demanded, and it is also required to attain further reduction in torque of the fluid dynamic bearing device.

Figure 9:
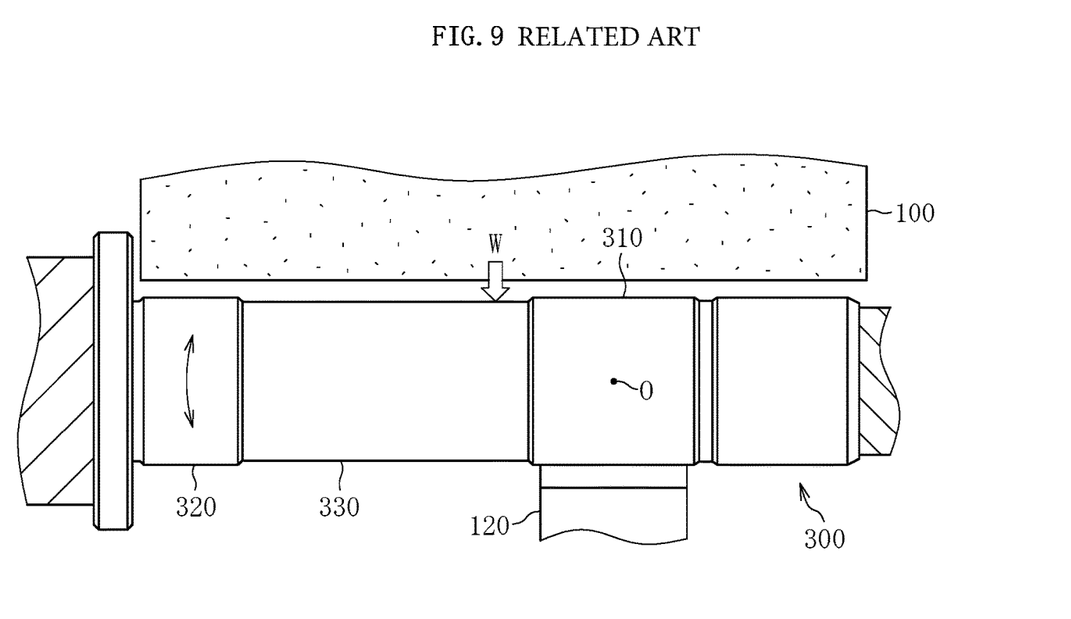
FIG. 9 is a sectional view for illustrating a problem of a conventional grinding step of the shaft member.

In order to meet such demand, as illustrated in FIG. 9, it is required to perform such design as to increase an axial dimension of the middle relief portion 330 to increase a span between the bearing surfaces 310 and 320. In this case, the bearing surface 310 on the counter-flange-side is formed at a position off-center to the counter-flange-side of the shaft member 300. Thus, when the bearing surface 310 on the counter-flange-side is supported by the shoe 120 similarly to the conventional cases, an axial deviation between the action line of the grinding load W and a supported region by the shoe 120 becomes larger. In this case, a difference between axial distances between the two bearing surfaces 310 and 320 and the supported region by the shoe 120 is larger, and hence the shaft material 300 during the grinding slightly swings about the region supported by the shoe 120 as a center (the swinging direction is indicated by the arrow and the swing center is indicated by reference symbol O). Therefore, it becomes apparent that finishing accuracy of the shaft material 300, in particular, coaxiality of the two radial bearing surfaces 310 and 320 is degraded, which leads degradation of bearing performance.

Note that, as means to solve the above-mentioned problem, it is also conceivable that a region of about three fourths of the axial length of the shaft member is supported by the shoe (FIG. 4 in Patent Literature 1). However, in this case, it is impossible to bring the shoe and the shaft material into contact with each other over the entire surfaces, and the shoe and the shaft material can be brought into contact with each other only in a limited small region. Thus, there is a problem in that the support position by the shoe fluctuates at the time of mass production. Therefore, grinding accuracy is adversely degraded, which becomes a factor of degrading the bearing performance.

In view of the above, an object of the present invention is to provide a shaft member for a fluid bearing device, which is capable of enhancing bearing performance, and a manufacturing method therefor.

Solutions to Problems

In order to achieve the above-mentioned object, the present invention is directed to a shaft member for a fluid bearing device, the shaft member including: two bearing surfaces separated from each other in an axial direction; and a middle relief portion formed between the two bearing surfaces and having a diameter smaller than the two bearing surfaces, the two bearing surfaces and the middle relief portion being formed on an outer peripheral surface of the shaft member, in which the middle relief portion includes: a cylindrical surface portion having a ground surface; and stepped portions arranged on both axial sides of the cylindrical surface portion and having a diameter difference from the cylindrical surface portion. Note that, the stepped portions may be formed to have turned surfaces or formed to have ground surfaces.

As described above, in the present invention, the cylindrical surface portion is formed to have a ground surface, and a high-accuracy region (cylindrical surface portion) is formed on the middle relief portion. Therefore, when the bearing surfaces are ground, the high-accuracy region is supported by a shoe, so that the grinding accuracy of the bearing surfaces can be enhanced. Further, the cylindrical surface portion of the middle relief portion is supported by the shoe. With this, even in a shaft member of long-axis type in which a span between the bearing surfaces is increased, and an action line of a grinding load (grinding-load center line) is brought closer to a region supported by the shoe, and, preferably, can be arranged in the region supported by the shoe. In this case, a difference between axial distances between the region supported by the shoe and the bearing surfaces becomes smaller. Therefore, a shaft material during the grinding is less liable to cause run-out, and even when the run-out is caused, an influence on the grinding accuracy of the two bearing surfaces can be made smaller. With the actions described above, the surface accuracy (circularity or the like) of each of the bearing surfaces after the grinding, and further, the accuracy (coaxiality or the like) between the two bearing surfaces can be enhanced.

Further, the stepped portions having a diameter difference from the cylindrical surface portion is formed on the middle relief portion. Therefore, a grinding wheel with a diameter difference is used when the middle relief portion and the bearing surfaces are ground. Thus, grinding on the middle relief portion and grinding on the bearing surfaces can be started simultaneously. Accordingly, a grinding time can be shortened. Further, even when grinding is performed with use of a grinding wheel formed with a forming tool (dresser) having been worn out, positions of ends of the bearing surfaces on the middle relief portion side do not fluctuate. Therefore, axial widths of the bearing surfaces can be stabilized.

Further, the middle relief portion and the bearing surfaces are ground simultaneously while the middle relief portion is supported by the shoe. Thus, the middle relief portion serves as a processing reference when the bearing surfaces are ground. Therefore, high coaxiality can be secured between the middle relief portion and each of the bearing surfaces. The cylindrical surface portion kept coaxially with each of the bearing surfaces with high accuracy is supported by the shoe, so that the grinding accuracy of the bearing surfaces can further be enhanced.

Note that, the cylindrical surface portion is a region having a diameter smaller than that of the bearing surfaces. Thus, it is hardly conceivable that accuracy of the cylindrical surface portion influences on bearing performance. Therefore, there is less necessity to perform grinding on the middle relief portion at high cost. The present invention is different from such common technical knowledge, and has a feature in that a grinding region (so-called waste grinding region) which is not particularly necessary in bearing function is formed on the middle relief portion.

The cylindrical surface portion is supported by the shoe during the grinding, so that a shoe mark being a scratch mark of the shoe is formed on the cylindrical surface portion. When the shoe mark remains on the cylindrical surface portion, it is understood that the cylindrical surface portion is supported by the shoe at the time of the grinding.

When the volume of the gap formed between the middle relief portion and the inner peripheral surface of the bearing member is large, an amount of lubricant oil filled in the bearing device is increased. Therefore, an amount of fluctuation of the oil surface level which is caused along with temperature change becomes larger, and there arises a problem in that the sealing structure of the bearing device is increased in size. In order to prevent this adverse effect, it is preferred that the diameter difference in diameter dimension between the cylindrical surface portion and the stepped portions of the shaft member be set to 80 μm or less. Further, it is preferred that an axial length of the stepped portions be set to 4 mm or less.

The fluid bearing device according to the present invention includes the shaft member described above; and a bearing member arranged on an outer periphery of the shaft member, in which a radial bearing gap is formed between a bearing surface of the shaft member and an inner peripheral surface of the bearing member. With use of the above-mentioned shaft member, it is possible to obtain a fluid bearing device with high rotational accuracy in which run-out is less liable to be caused.

Further, according to the present invention, there is provided a manufacturing method for a shaft member for a fluid bearing device, the shaft member including two bearing surfaces separated from each other in an axial direction, and a middle relief portion formed between the two bearing surfaces and having a diameter smaller than a diameter of both the bearing surfaces, in which the middle relief portion and the bearing surfaces are ground simultaneously while the middle relief portion is supported by a shoe.

In this case, it is conceivable that after the middle relief portion and bearing surfaces are formed by turning on a metal material, the middle relief portion and the bearing surfaces are ground simultaneously as described above. In addition, after a metal material may be forged, the middle relief portion and the bearing surfaces may be ground and further ground simultaneously as described above.

Advantageous Effects of Invention

With the shaft member according to the present invention, the bearing performance of the fluid dynamic bearing device can be enhanced.

DESCRIPTION OF EMBODIMENTS

Hereinafter, embodiments of the present invention are described with reference to the drawings.

Figure 1:
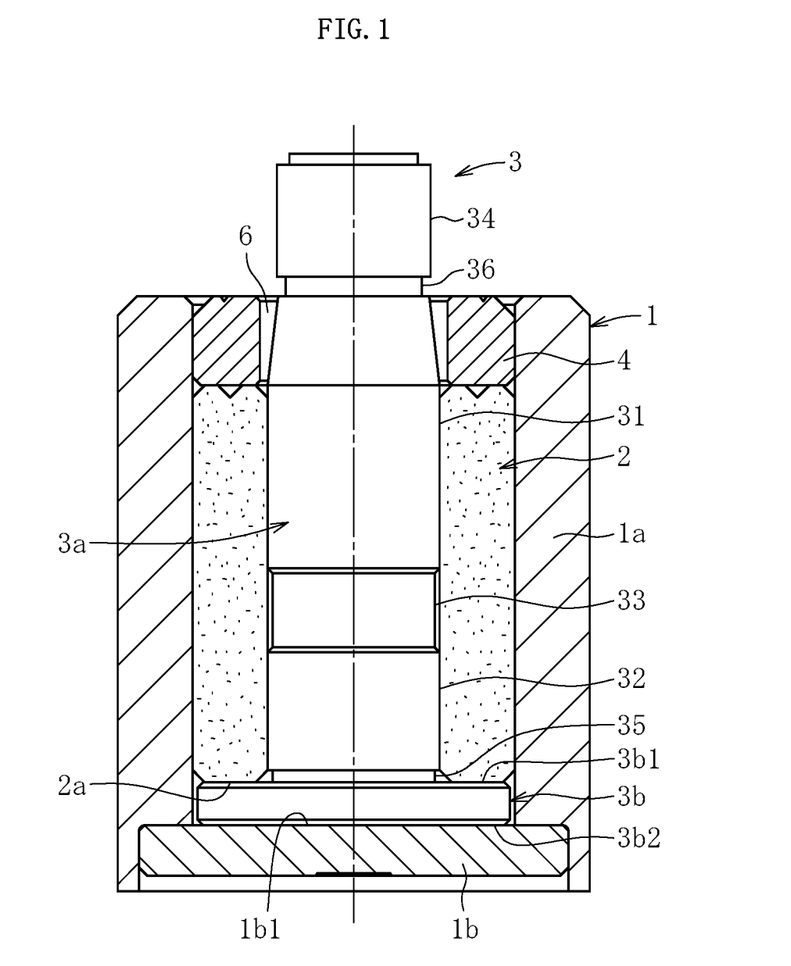
FIG. 1 is a sectional view for illustrating an overall configuration of a fluid dynamic bearing device.

FIG. 1 illustrates a fluid dynamic bearing device to be used in a general-purpose HDD as an example of a fluid bearing device.

This fluid dynamic bearing device includes a housing 1 having a bottomed cylindrical shape, a bearing member 2 having a cylindrical shape and fixed to an inner periphery of the housing 1, a shaft member 3 inserted along an inner periphery of the bearing member, and a sealing member 4 arranged at an opening portion of the housing.

The housing 1 includes a side portion 1a having a cylindrical shape, and a bottom portion 1b closing the opening portion on one axial end of the side portion 1a. The bottom portion 1b of the housing 1 may be formed as a separate member from the side portion 1a or may also be formed integrally with the side portion 1a. The shaft member 3 is formed of stainless steel or the like, and includes a shaft portion 3a and a flange portion 3b provided on one axial end of the shaft portion 3a. The shaft portion 3a and the flange portion 3b may be formed integrally with each other or may be formed as separate members. The bearing member 2 having a cylindrical shape and made of sintered metal or the like is fixed to an inner peripheral surface of the side portion 1a of the housing 1, and the shaft portion 3a of the shaft member 3 is inserted along an inner periphery of the bearing member 2. The flange portion 3b of the shaft member 3 is arranged between an end surface 1b1 on the housing-inner-side (inner bottom surface) of the bottom portion 1b and an end surface 2a on one axial side of the bearing member 2.

The sealing member 4, which is held in contact with an end surface on another axial side of the bearing member 2, is fixed to the inner periphery of the housing 1. The entirety of the internal space of the housing 1 including inner pores of the bearing member 2 made of sintered metal is filled with lubricant oil. A sealing gap 6 having a tapered shape is formed between an inner peripheral surface of the sealing member 4 and an outer peripheral surface of the shaft portion 3a, and an amount of lubricant oil inside the housing 1 is set such that an oil surface is located within the sealing gap 6. The sealing gap 6 having a tapered shape prevents leakage of lubricant oil to the outside of the housing 1, and also functions as an oil buffer that absorbs volumetric change of lubricant oil, which is caused along with temperature change.

Figure 2:
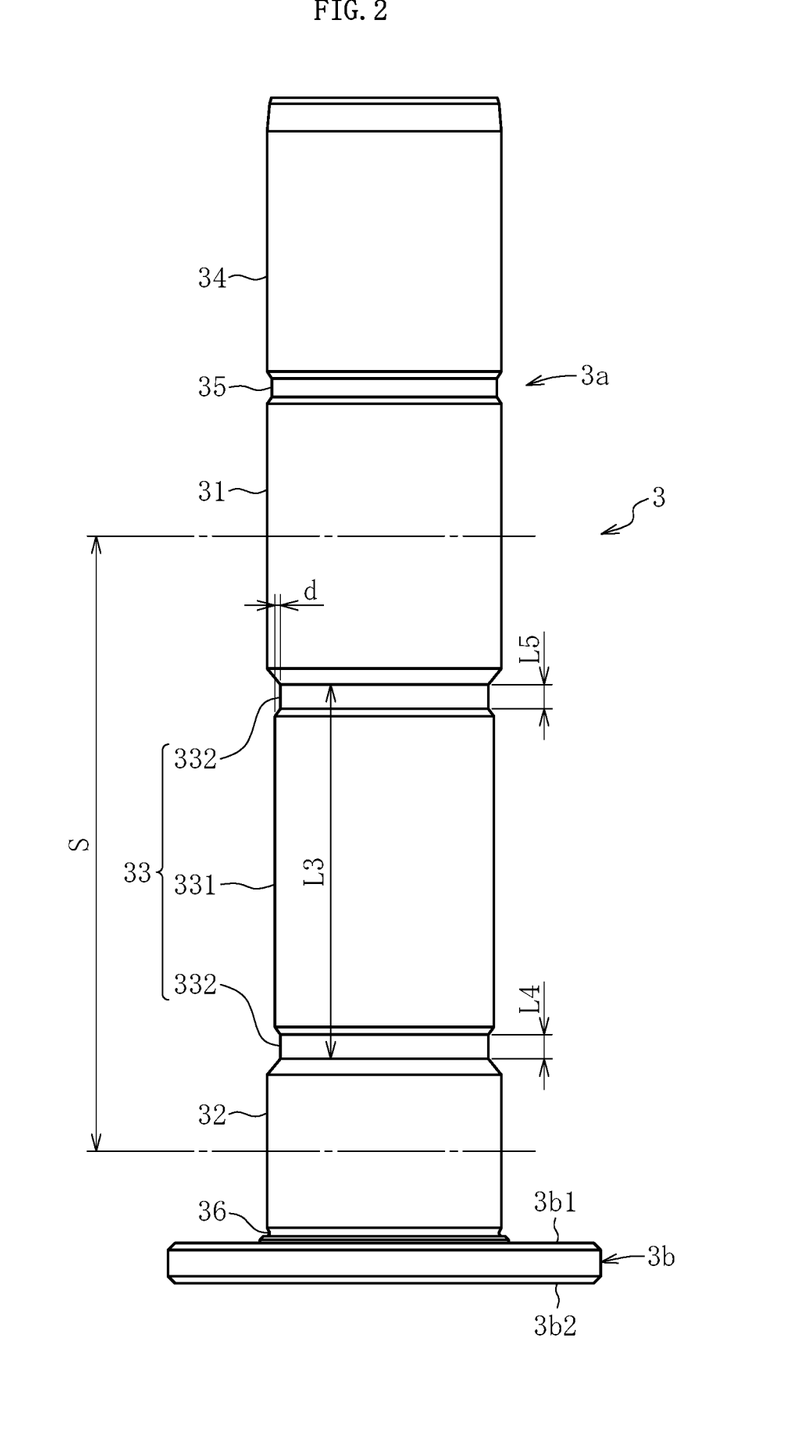
FIG. 2 is a front view for illustrating a shaft member according to the present invention.

FIG. 2 illustrates the shaft member 3 according to the present invention. The shaft portion 3a of the shaft member 3 includes two radial bearing surfaces 31 and 32, a middle relief portion 33, and a hub fixing portion 34. The two bearing surfaces 31 and 32 have the same diameter dimension, and are formed so as to be separated from each other in the axial direction. The middle relief portion 33 formed so as to have a diameter smaller than those of the bearing surfaces 31 and 32 is arranged between the two bearing surfaces 31 and 32. The middle relief portion 33 includes a cylindrical surface portion 331 and stepped portions 332 arranged on both axial sides of the cylindrical surface portion 331. The stepped portions 332 of the middle relief portion 33 are portions having a diameter difference from the cylindrical surface portion 331, and, in this embodiment, the stepped portions 332 formed so as to have a diameter smaller than that of the cylindrical surface portion 331 are exemplified. An axial length L2 of the cylindrical surface portion 331 (see FIG. 4) is, for example, 5 mm.

The hub fixing portion 34 has the same diameter dimension as those of the bearing surfaces 31 and 32, and is formed on an end portion on a counter-flange-side of the shaft portion 3a. After completion of assembly of the fluid bearing device, a disk hub holding a plurality of magnetic disks is fixed to the hub fixing portion 34 by press fitting, or the like. A first recess portion 35 is formed between the hub fixing portion 34 and the bearing surface 31 on the counter-flange-side. Further, a second recess portion 36 is formed between the bearing surface 32 on the flange side and an upper end surface 3b1 of the flange portion 3b.

A plurality of dynamic pressure generating grooves arrayed in a herringbone pattern or the like are formed in any one of the bearing surfaces 31 and 32 of the shaft portion 3a and the inner peripheral surface of the bearing member 2, which is opposed to the bearing surfaces 31 and 32 (for example, the inner peripheral surface of the bearing member 2). Further, a plurality of dynamic pressure generating grooves arrayed in a spiral pattern or the like are formed in any one of the upper end surface 3b1 of the flange portion 3b and the end surface 2a of the bearing member 2, which is opposed to the upper end surface 3b1 (for example, the end surface 2a of the bearing member 2). Further, a plurality of dynamic pressure generating grooves arrayed in a spiral pattern or the like are similarly formed in any one of a lower end surface 3b2 of the flange portion 3b and an inner bottom surface 1b1 of the housing 1 (for example, the inner bottom surface 1b1 of the housing).

During relative rotation of the shaft member 3 and the bearing member 2 (for example, during rotation of the shaft member 3), a dynamic pressure effect of lubricant oil is generated in radial bearing gaps between the radial bearing surfaces 31 and 32 of the shaft member 3 and the inner peripheral surface of the bearing member 2 due to the dynamic pressure generating grooves. Further, a dynamic pressure effect of lubricant oil is generated in each of a thrust bearing gap formed between the upper end surface 3b1 of the flange portion 3b and the lower end surface 2a of the bearing member 2 and a thrust bearing gap formed between the lower end surface 3b2 of the flange portion 3b and the inner bottom surface 1b1 of the housing 1 due to the dynamic pressure generating grooves. In such configuration, the shaft member 3 is supported in a non-contact manner in both the radial direction and the thrust direction.

Figure 3A:
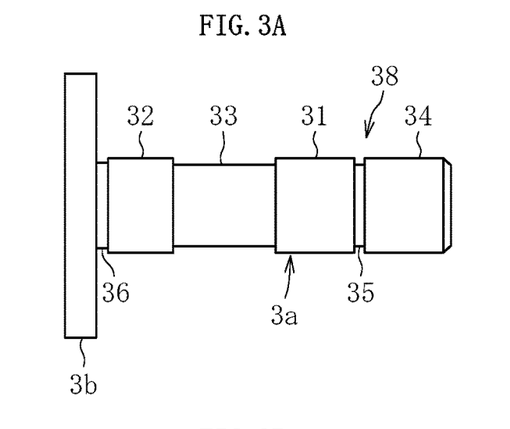
FIG. 3A is a front view for illustrating a shaft material after a turning step.
Figure 3B:
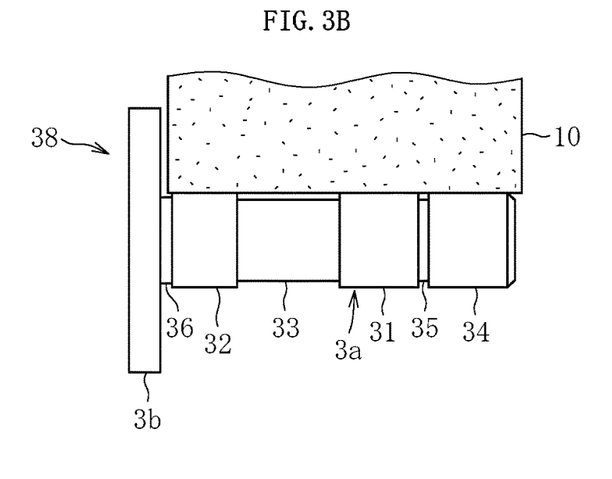
FIG. 3B is a sectional view for illustrating a grinding step in a manufacturing step of the shaft member.

The shaft member 3 in the fluid dynamic bearing device described above is manufactured as follows. Specifically, a shaft material 38 is formed from a metal material by turning as illustrated in FIG. 3A, and, subsequently, the shaft material 38 is subjected to cylindrical grinding as illustrated in FIG. 3B.

In the turning step, the bearing surfaces 31 and 32, the middle relief portion 33, the hub fixing portion 34, the first recess portion 35, and the second recess portion 36 are formed on the shaft material 38. At this time, the cylindrical surface portion 331 and the stepped portions 332 are formed on the middle relief portion 33. The shaft material 38 having been turned proceeds to a grinding step, and is subjected to grinding processing using a grinding wheel 10 having a cylindrical shape illustrated in FIG. 4 in the grinding step.

Figure 4:
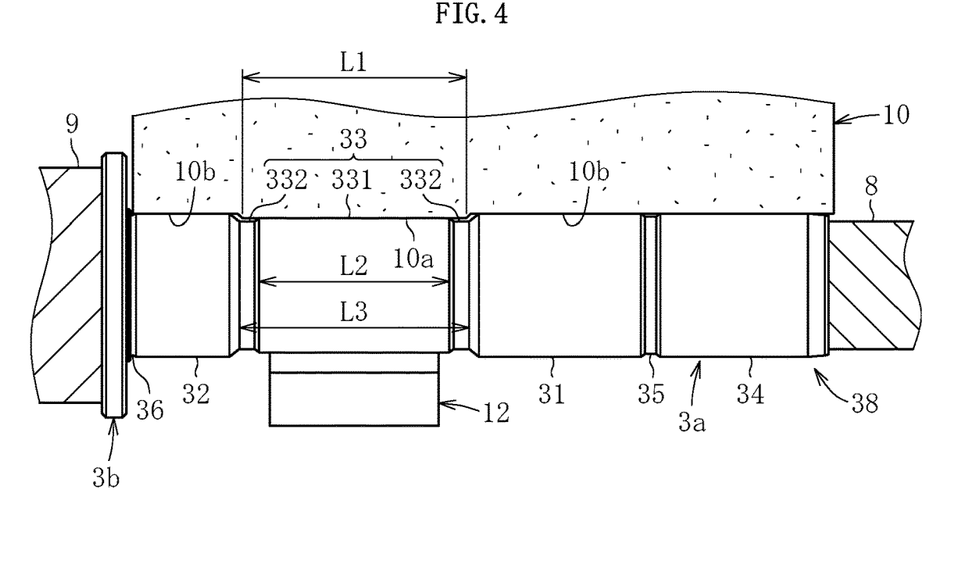
FIG. 4 is a sectional view for illustrating the grinding step of the shaft member according to an embodiment.

In the grinding step, cylindrical grinding is performed. As illustrated in FIG. 4, the shaft material 38 during the grinding is rotationally driven under a state of being sandwiched by driving plates 8 and 9 at a lower end surface of the flange portion 3b and a distal end surface of the shaft portion 3a. The grinding wheel 10 includes a large-diameter portion 10a and small-diameter portions 10b. The large-diameter portion 10a is pressed against the middle relief portion 33, and the small-diameter portions 10b are pressed against the bearing surfaces 31 and 32 and the hub fixing portion 34, so that the bearing surfaces 31 and 32, the cylindrical surface portion 331 of the middle relief portion 33, and the hub fixing portion 34 are ground simultaneously. An axial length L1 of the large-diameter portion 10a of the grinding wheel 10 is set larger than the axial length L2 of the cylindrical surface portion 331 so that the entire surface of the cylindrical surface portion 331 is ground. Meanwhile, the axial length L1 of the large-diameter portion 10a is set smaller than an axial length L3 of the middle relief portion 33 so that the large-diameter portion 10a of the grinding wheel 10 does not interfere with the bearing surfaces 31 and 32. Therefore, a relation of L2<L1<L3 is satisfied. Note that, each of the axial lengths L1, L2, and L3 refers to a length not including chamfers adjacent to both axial sides of each of the large-diameter portion 10a, the cylindrical surface portion 331, and the middle relief portion 33.

Through the grinding step described above, the bearing surfaces 31 and 32, the cylindrical surface portion 331, and the hub fixing portion 34 are each formed into a ground surface having grinding marks. Meanwhile, the stepped portions 332, the first recess portion 35, and the second recess portion 36 are each formed into a turned surface having turning marks. Further, the bearing surfaces 31 and 32, the cylindrical surface portion 331, and the hub fixing portion 34 have excellent surface accuracy (surface roughness, circularity, or the like) as compared to the stepped portions 332, the first recess portion 35, and the second recess portion 36.

The shaft material 38 during the grinding is supported by a shoe 12 as a support member for supporting a load from the grinding wheel. An axial length of the shoe 12 is smaller than the axial length L2 of the cylindrical surface portion 331 of the middle relief portion 33. Therefore, during the grinding, the entire surface of the shoe 12 slides against the cylindrical surface portion 331 of the middle relief portion 33. It is conceivable that the shoe 12 is increased in size in the axial direction so that the entire surface of the shaft portion 3a is supported by the shoe 12. In such configuration, however, the contact portion between the shoe 12 and the shaft material 38 is not stabilized at one portion. Thus, there is a problem in that the orientation of the shaft material 38 during the grinding is adversely destabilized. Therefore, it is preferred that the shoe 12 be set to have such an axial length as to allow contact only with the cylindrical surface portion 331 as described above. Due to the sliding against the shoe 12 during the grinding, a scratch mark (shoe mark) by the shoe is formed on the surface of the cylindrical surface portion 331.

After completion of the grinding on the bearing surfaces 31 and 32 and the cylindrical surface portion 331, both end surfaces of the flange portion 3b are ground, and further, final finishing (barrel polishing or the like) is performed on the entirety of the shaft material 38 as necessary. In this manner, the shaft member 3 illustrated in FIG. 2 is completed. After that, the shaft member 3 is accommodated inside the housing 1 such that the flange portion 3b is directed to the bottom portion side of the housing. Further, the bearing member 2 and the sealing member 4 are sequentially accommodated inside the housing 1, and the members 2 and 4 are fixed to the housing 1. In this manner, the fluid dynamic bearing device is assembled. Lubricant oil is supplied to the inside of the housing 1 in such a manner that the lubricant oil is filled in the housing 1 in advance before the assembly described above, or vacuum impregnation or the like is performed after completion of the assembly. With this, at least the radial bearing gaps, the thrust bearing gaps, and the gap formed between the middle relief portion 33 and the inner peripheral surface of the bearing member 2 are filled with lubricant oil (preferably, all the spaces inside the housing 1 are filled with lubricant oil), so that the fluid dynamic bearing device illustrated in FIG. 1 is completed.

The shaft member 3 illustrated in FIG. 2 is used in a fluid dynamic bearing device for a high-capacity HDD which is suitable for use in a server or the like. Having a large number of disks, the fluid dynamic bearing device of this type is required to have high bearing rigidity, and is also required to reduce bearing torque to the extent possible in order to reduce power consumption. In order to meet the requirements described above, in the shaft member 3 illustrated in FIG. 2, a bearing span is set larger by increasing the axial length of the middle relief portion 33 as compared to a general-purpose shaft member. Specifically, in the shaft member 3 in FIG. 2, a ratio (S/L3) of an inter-bearing-surface-center distance S (distance between axial centers of the bearing surfaces 31 and 32) to the axial length of the middle relief portion 33 falls within a range of 1.1<S/L3<2.5 (a shaft portion having this feature is referred to as a "long-axis type").

In the present invention, a part of the middle relief portion 33 is ground to form a high-accuracy region (cylindrical surface portion 331) on the middle relief portion 33. That is, the high-accuracy region (cylindrical surface portion 331) having smaller surface roughness and low-accuracy regions (stepped portions 332) having larger surface roughness are formed on the middle relief portion 33. When the bearing surfaces 31 and 32 are ground, the high-accuracy region is supported by the shoe, so that grinding accuracy of the bearing surfaces 31 and 32 can be enhanced. Further, the cylindrical surface portion 331 of the middle relief portion 33 is supported by the shoe 12, and, thus, an action line of a grinding load (grinding-load center line) is brought closer to the region supported by the shoe 12, and, preferably, can be arranged in the region supported by the shoe 12. In this case, a difference between axial distances between the region supported by the shoe 12 and the bearing surfaces 31 and 32 becomes smaller. Therefore, the shaft material 38 during the grinding is less liable to cause run-out, and even when the run-out is caused, an influence on the grinding accuracy of the two bearing surfaces 31 and 32 can be made smaller. With the actions described above, the surface accuracy (circularity or the like) of each of the bearing surfaces after the grinding, and further, the accuracy (coaxiality or the like) between the two bearing surfaces can be enhanced.

In addition, the cylindrical surface portion 311 of the middle relief portion 33 is ground simultaneously with the bearing surfaces 31 and 32. Thus, the cylindrical surface portion 311 serves as a processing reference when the bearing surfaces 31 and 32 are ground. Therefore, high coaxiality (for example, coaxiality of 10 μm or less) can be secured between the cylindrical surface portion 331 and each of the bearing surfaces 31 and 32. The cylindrical surface portion 311 kept coaxially with each of the bearing surfaces 31 and 32 with high accuracy is supported by the shoe 12, so that the grinding accuracy of the bearing surfaces 31 and 32 can further be enhanced.

Figure 5:
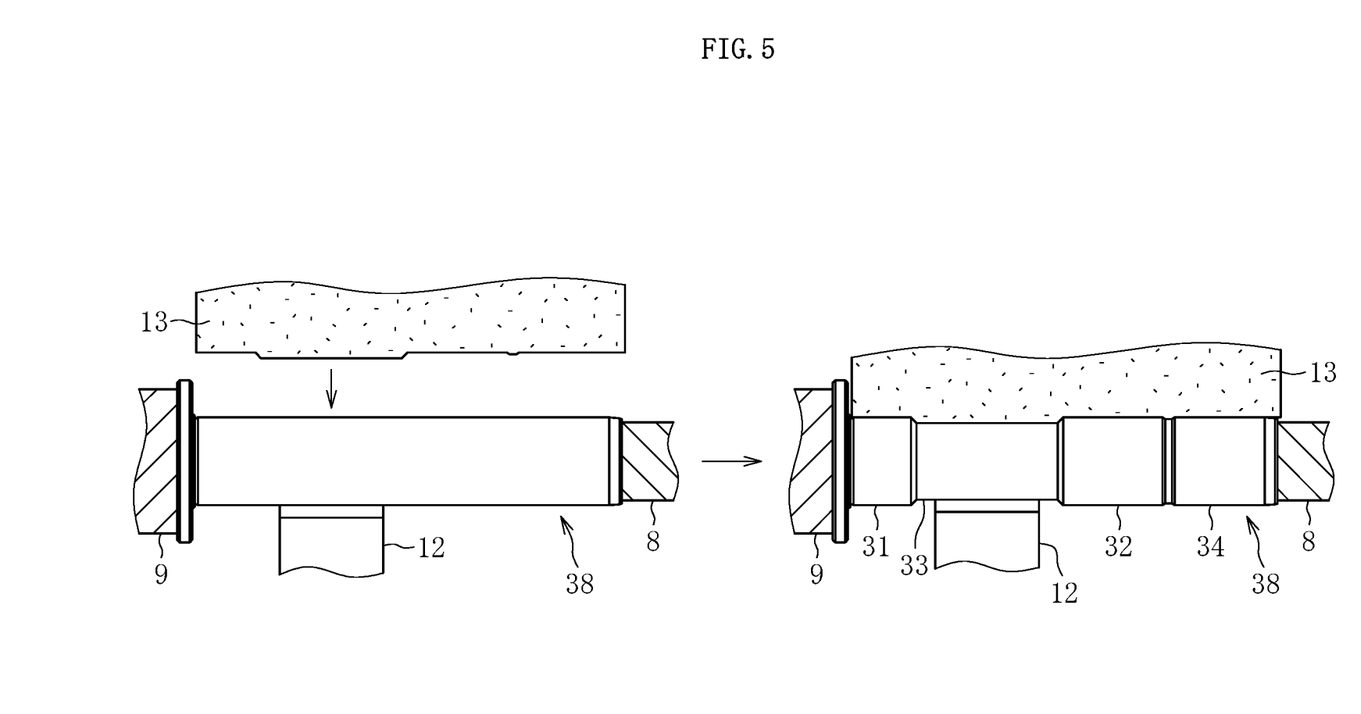
FIG. 5 is a sectional view for illustrating a grinding step of the shaft member according to a comparative example.

The actions and effects described above can also be obtained in such a manner that the bearing surfaces 31 and 32 and the middle relief portion 33 are ground simultaneously through use of a formed grinding wheel 13 illustrated in FIG. 5. However, in such configuration, a grinding allowance in the middle relief portion 33 is larger than grinding allowances of the bearing surfaces 31 and 32. Thus, it is required to start grinding on the middle relief portion 33 prior to grinding on the bearing surfaces 31 and 32. Therefore, there arises a problem in that a grinding time is increased, and manufacturing cost is increased. Further, when wear of a forming tool progresses at the time of forming the grinding wheel 10 with the forming tool such as a dresser, positions of boundary corner portions between the large-diameter portion 10a and the small-diameter portions 10b of the grinding wheel 10 fluctuate. This leads to fluctuation of axial lengths of the bearing surfaces 31 and 32 having been ground, and hence is undesirable in consideration of the bearing function. In contrast, as in the present invention, the stepped portions 332 having a diameter difference from the cylindrical surface portion 331 are formed on both the axial sides of the cylindrical surface portion 331 in the middle relief portion 33, so that such disadvantage can be prevented.

Meanwhile, when the volume of the gap between the middle relief portion 33 and the inner peripheral surface of the bearing member 2 is excessively large, the amount of lubricant oil inside the housing 1 is increased correspondingly, and fluctuation of the oil surface level which is caused along with temperature change becomes larger. Thus, it is required to increase the size of the sealing gap 6. In order to prevent such disadvantage, it is preferred that the volume between the middle relief portion 33 and the inner peripheral surface of the bearing member 2 be reduced to the extent possible. Meanwhile, when the gap width between the middle relief portion 33 and the inner peripheral surface of the bearing member 2 is excessively small, torque loss is increased. In order to solve the problem described above, as illustrated in FIG. 2, it is preferred that a diameter difference (2×d) in diameter dimension between the cylindrical surface portion 331 and the stepped portions 332 and axial lengths L4 and L5 of the stepped portions be reduced to the extent possible. Specifically, the diameter difference in diameter dimension is set to 80 μm or less, preferably, 50 μm or less. Further, the axial lengths L4 and L5 of the stepped portions 332 are each set to 4 mm or less.

Figure 6:
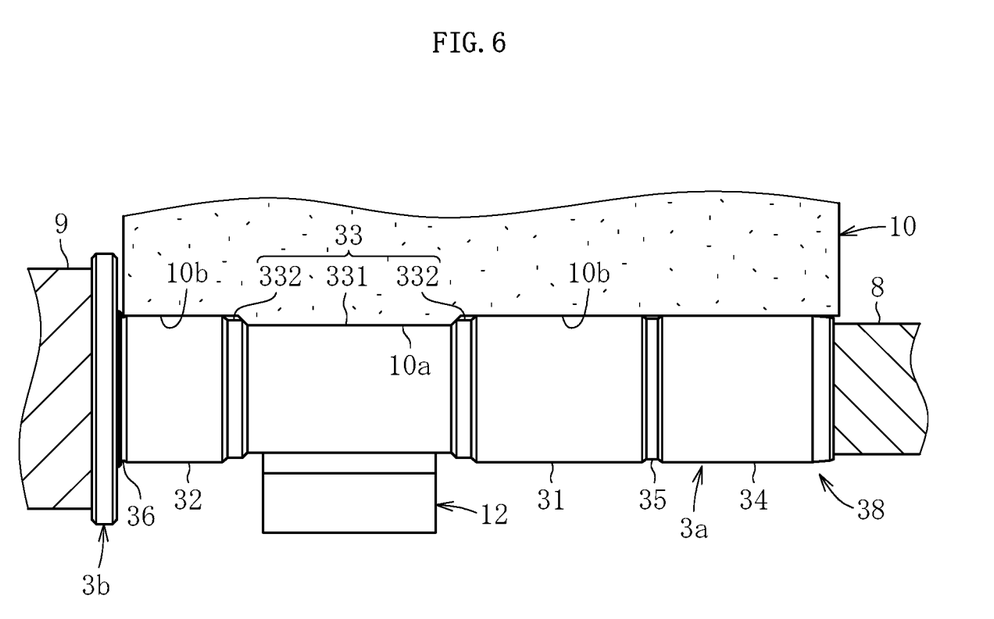
FIG. 6 is a sectional view for illustrating a grinding step of the shaft member according to another embodiment.

In the embodiment described above, in the middle relief portion 33, the outer-diameter dimension of the stepped portions 332 is set smaller than the outer-diameter dimension of the cylindrical surface portion 331. However, conversely, as illustrated in FIG. 6, the outer-diameter dimension of the stepped portions 332 may be set larger than the outer-diameter dimension of the cylindrical surface portion 331. Note that, also in this case, the outer-diameter dimension of the stepped portions 332 is set smaller than the outer-diameter dimension of the bearing surfaces 31 and 32. In such configuration, the stepped portions 332 are to be slightly ground by the grinding wheel. However, grinding allowances are extremely small, and hence a processing time is not increased. Further, fluctuation of the axial lengths of the bearing surfaces 31 and 32 caused due to wear of a grinding wheel forming tool also does not cause a problem.

Figure 7A:
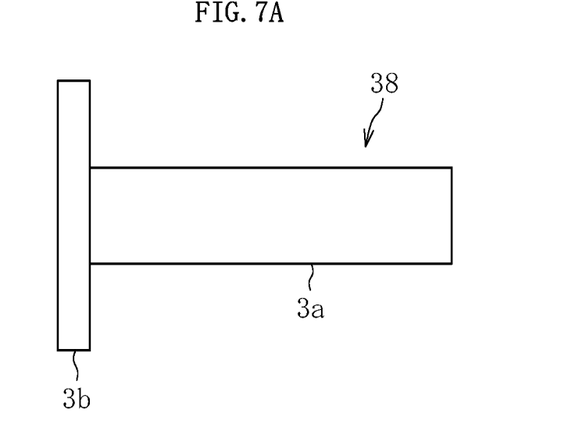
FIG. 7A is a front view for illustrating the shaft material after a forging step.
Figure 7B:
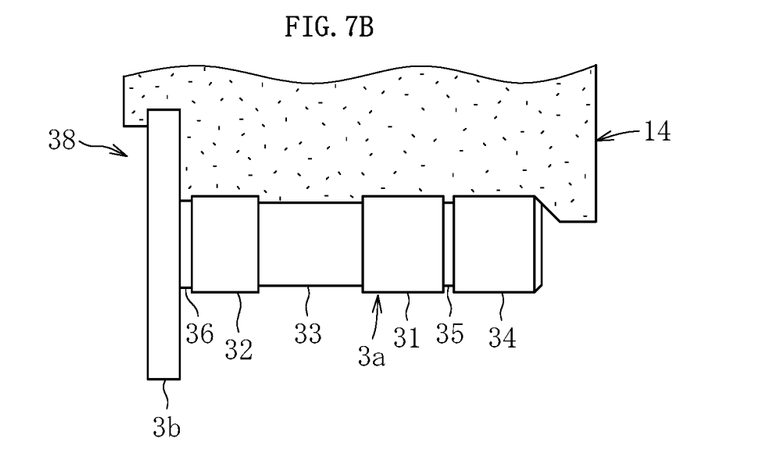
FIG. 7B is a sectional view for illustrating the grinding step in the manufacturing step of the shaft member.
Figure 7C:
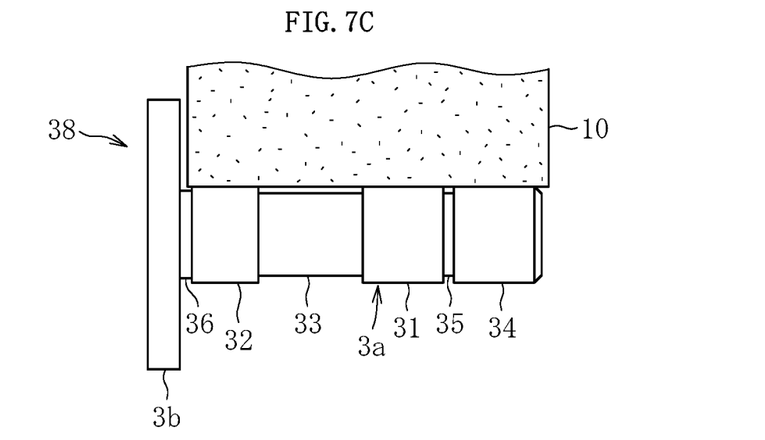
FIG. 7C is a sectional view for illustrating the grinding step in the manufacturing step of the shaft member.

In the description above, description is made of the case where the middle relief portion 33, the bearing surfaces 31 and 32, the hub fixing portion 34, and the like are roughly formed by turning, and then, those portions are finished by cylindrical grinding. However, the manufacture procedure of the shaft member 3 is not limited thereto. For example, the following procedure is conceivable. Specifically, as illustrated in FIG. 7A, the shaft material 38 is forged, and then, as illustrated in FIG. 7B, the middle relief portion 33, the bearing surfaces 31 and 32, the hub fixing portion 34, the first recess portion 35, and the second recess portion 36 are formed by angular grinding using a formed grinding wheel 14. After that, as illustrated in FIG. 7C, the bearing surfaces 31 and 32 and the hub fixing portion 34 are finished by cylindrical grinding. In this case, as the cylindrical grinding illustrated in FIG. 7C, the grinding method illustrated in FIG. 4 or 6 is employed, so that actions and effects similar to those described above can be obtained.

In the shaft member 3 manufactured in this procedure, all of the bearing surfaces 31 and 32, the cylindrical surface portion 331, the hub fixing portion 34, the stepped portions 332, the first recess portion 35, and the second recess portion 36 have ground surfaces. Note that, the stepped portions 332, the first recess portion 35, and the second recess portion 36 have ground surfaces formed by angular grinding, whereas the bearing surfaces 31 and 32, the cylindrical surface portion 331, and the hub fixing portion 34 have ground surfaces subjected to cylindrical grinding in addition to angular grinding. Therefore, in general, surface accuracy (surface roughness, circularity, and the like) is more excellent in the latter than in the former.

In the description above, the fluid dynamic bearing device for use in an HDD for a server is exemplified. However, the fluid bearing device according to the present invention is not limited to usage in an HDD, but can be widely used in various applications. Further, the configuration of the fluid dynamic bearing device is also not limited to the configuration illustrated in FIG. 1.

REFERENCE SIGNS LIST 1 housing
2 bearing member
3 shaft member
3a shaft portion
3b flange portion
4 sealing member
10 grinding wheel
12 shoe
31 bearing surface (counter-flange-side)
32 bearing surface (flange side)
33 middle relief portion
34 hub fixing portion
331 cylindrical surface portion
332 stepped portion

The invention claimed is:

1. A shaft member for a fluid bearing device, the shaft member comprising:
   two bearing surfaces separated from each other in an axial direction; and
   a middle relief portion formed between the two bearing surfaces and having a diameter smaller than a diameter of the two bearing surfaces,
     the two bearing surfaces and the middle relief portion being formed on an outer peripheral surface of the shaft member,
   wherein the middle relief portion includes:

a ground cylindrical surface portion; and stepped portions arranged on both axial sides of the ground cylindrical surface portion and having a diameter difference from the ground cylindrical surface portion.

2. The shaft member for a fluid bearing device according to claim 1, wherein the ground cylindrical surface portion has a shoe mark.

3. The shaft member for a fluid bearing device according to claim 2, wherein the diameter difference between a diameter of the ground cylindrical surface portion and a diameter of the stepped portions is 80 µm or less.

4. The shaft member for a fluid bearing device according to claim 3, wherein an axial length of the stepped portions is 4 mm or less.

5. The shaft member for a fluid bearing device according to claim 3, wherein the stepped portions are turned.

6. The shaft member for a fluid bearing device according to claim 2, wherein an axial length of the stepped portions is 4 mm or less.

7. The shaft member for a fluid bearing device according to claim 6, wherein the stepped portions are turned.

8. The shaft member for a fluid bearing device according to claim 2, wherein the stepped portions are turned.

9. The shaft member for a fluid bearing device according to claim 1, wherein the diameter difference between a diameter of the ground cylindrical surface portion and a diameter of the stepped portions is 80 µm or less.

10. The shaft member for a fluid bearing device according to claim 9, wherein an axial length of the stepped portions is 4 mm or less.

11. The shaft member for a fluid bearing device according to claim 10, wherein the stepped portions are turned.

12. The shaft member for a fluid bearing device according to claim 9, wherein the stepped portions are turned.

13. The shaft member for a fluid bearing device according to claim 1, wherein an axial length of the stepped portions is 4 mm or less.

14. The shaft member for a fluid bearing device according to claim 13, wherein the stepped portions are turned.

15. The shaft member for a fluid bearing device according to claim 1, wherein the stepped portions are turned.

16. The shaft member for a fluid bearing device according to claim 1, wherein the stepped portions are ground.

17. A fluid bearing device, comprising:

the shaft member according to claim 1; and a bearing member arranged on an outer periphery of the shaft member, wherein a radial bearing gap is formed between a bearing surface of the shaft member and an inner peripheral surface of the bearing member.

18. A manufacturing method for a shaft member for a fluid bearing device, the shaft member including two bearing surfaces separated from each other in an axial direction, and a middle relief portion formed between the two bearing surfaces and having a diameter smaller than a diameter of both the bearing surfaces, the manufacturing method comprising:

forming the middle relief portion and the bearing surfaces by turning on a metal material; and after the forming, simultaneously grinding the middle relief portion and the bearing surfaces while only the middle relief portion is supported by a shoe.

19. A manufacturing method for a shaft member for a fluid bearing device, the shaft member including two bearing surfaces separated from each other in an axial direction, and a middle relief portion formed between the two bearing surfaces and having a diameter smaller than a diameter of both the bearing surfaces, the manufacturing method comprising:

forging a metal material; and after the forging, grinding the middle relief portion and the bearing surfaces and further simultaneously grinding the middle relief portion and the bearing surfaces while only the middle relief portion is supported by a shoe.

* * * * *